US008185072B2

(12) United States Patent
Hunsaker et al.

(10) Patent No.: US 8,185,072 B2
(45) Date of Patent: May 22, 2012

(54) METHOD AND APPARATUS FOR POWER REDUCTION FOR INTERCONNECT LINKS

(75) Inventors: Mikal Hunsaker, El Dorado Hills, CA (US); Karthi R. Vadivelu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1041 days.

(21) Appl. No.: 11/690,759

(22) Filed: Mar. 23, 2007

(65) Prior Publication Data

US 2008/0233912 A1 Sep. 25, 2008

(51) Int. Cl.
*H04B 1/10* (2006.01)

(52) U.S. Cl. ..... 455/225; 455/574; 455/217; 455/127.5; 455/343.2; 710/49; 710/262; 713/323

(58) Field of Classification Search .......... 455/218–225, 455/343.2–343.4, 127.5, 574, 217; 710/49, 710/262; 713/320–324
See application file for complete search history.

(56) References Cited

U.S. PATENT DOCUMENTS

| 6,593,801 | B1 * | 7/2003 | Hattori | 327/544 |
|---|---|---|---|---|
| 6,598,104 | B1 * | 7/2003 | Jaramillo et al. | 710/110 |
| 7,441,128 | B2 * | 10/2008 | Ho et al. | 713/300 |
| 7,480,808 | B2 * | 1/2009 | Caruk et al. | 713/300 |
| 7,653,367 | B2 * | 1/2010 | Song et al. | 455/218 |
| 2003/0198296 | A1 * | 10/2003 | Bonelli et al. | 375/257 |
| 2004/0103333 | A1 * | 5/2004 | Martwick et al. | 713/400 |
| 2005/0231232 | A1 * | 10/2005 | Schoenborn et al. | 326/30 |
| 2006/0047984 | A1 * | 3/2006 | Ho et al. | 713/300 |
| 2007/0116134 | A1 * | 5/2007 | Schoenborn | 375/257 |
| 2008/0063129 | A1 * | 3/2008 | Voutilainen | 375/376 |
| 2010/0111539 | A1 * | 5/2010 | Aronson et al. | 398/135 |

OTHER PUBLICATIONS

PCI-SIG; PCI Express Base Specification Revision 2.0; Dec. 20, 2006; pp. 293-323.

* cited by examiner

*Primary Examiner* — Edward Urban
*Assistant Examiner* — Rui Hu
(74) *Attorney, Agent, or Firm* — Blakely, Sokoloff, Taylor & Zafman, LLP

(57) ABSTRACT

A power reduction proposal for a receiver circuit that adheres to a plurality of defined states and masking logic to mask the output of the squelch receiver. Furthermore, the proposal utilizes and counters to count the various timeout conditions. Consequently, the squelch receiver consumes less power and can be either powered down or periodically enabled to allow for polling.

14 Claims, 4 Drawing Sheets

METHOD AND APPARATUS FOR POWER REDUCTION FOR INTERCONNECT LINKS

BACKGROUND OF THE INVENTION

1. Field of the Invention

The present invention relates to interconnect links, specifically, a method and apparatus for power reduction in receiver circuitry used for an interconnect link.

2. Description of the Related Art

As is well known, input/output (I/O) buses connect different components together in a computer system. One example of an I/O bus is a link, which is a point-to-point interconnect connecting two components (these components can be on the same circuit board or across two different boards). A link could be bi-directional and consists of an out-going direction and an in-coming direction. Likewise, the width of the link is scalable from one bit (a.k.a. serial) to multiple bits in parallel. A single bit is transferred from the source component via a transmitter and received at the destination via a receiver. In the multi-bit parallel links, multiple bits are transferred simultaneously in parallel through multiple transmitter and receiver pairs. The signaling technology can be single-ended or differential.

PCI-express and SCID links are utilized for serial interface communication. For reference, PCI-express is discussed in "PCI-express Base Specification Rev 1.0, Jul. 22, 2002".

Squelch receivers are used by serial interfaces such as PCI Express to detect an exit from electrical idle initiated by the device on the other side of the link. Electrical idle is a steady state condition where the transmitter and receiver voltages are held constant. Nonetheless, the squelch receivers need to remain powered on when the rest of the receiver circuit is in a low power mode. Consequently, this increases the power consumption for the interconnect link circuitry.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

An area of current technological development relates to I/O buses. As previously described, the existing solutions require the squelch receivers to remain powered on when the rest of the receiver circuit is in a low power mode during an electrical idle state. Consequently, this increases the power consumption for the interconnect link circuitry.

In contrast, a method, apparatus, and a system are proposed that turning off the squelch receivers when the interconnect link is one of several predetermined states and periodically turning on for sampling the state of the interconnect link, commonly referred to as polling. In one embodiment, the time period between each sample of the state of the interconnect link is adjusted based at least in part on the state of the interconnect link such that the latency for detecting an exit from a particular state is within acceptable levels.

Figure 1:
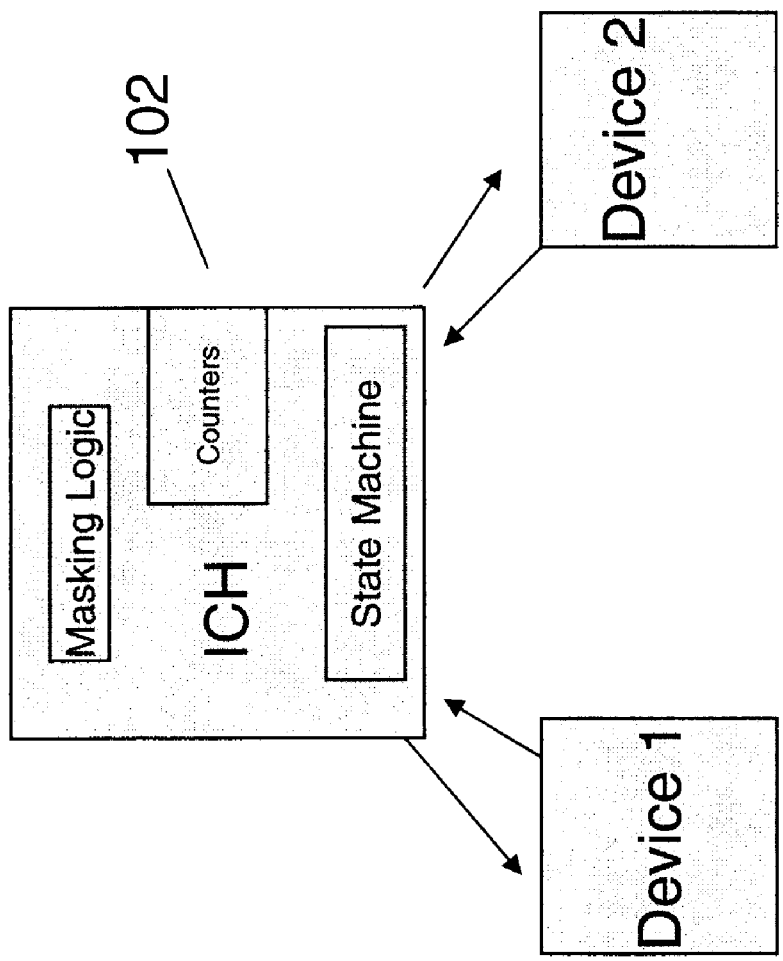
FIG. 1 is a block diagram for an input/output controller hub as utilized in one embodiment of the claimed subject matter.

FIG. 1 is a block diagram for an input/output controller hub (ICH) as utilized in one embodiment of the claimed subject matter. In this embodiment, the ICH 102 contains logic to facilitate the interconnect link established between device 1 and device 2. In this embodiment, both devices have receiver and transmitter circuitry that are controlled by ICH 102 in a manner that will be described in the following figures.

In one embodiment, the ICH comprises a State Machine to control the power state of the Squelch Receiver, masking logic to mask the output of the squelch receiver and counters to count the various timeout conditions. Consequently, the squelch receiver in either device can be powered down.

Figure 2:
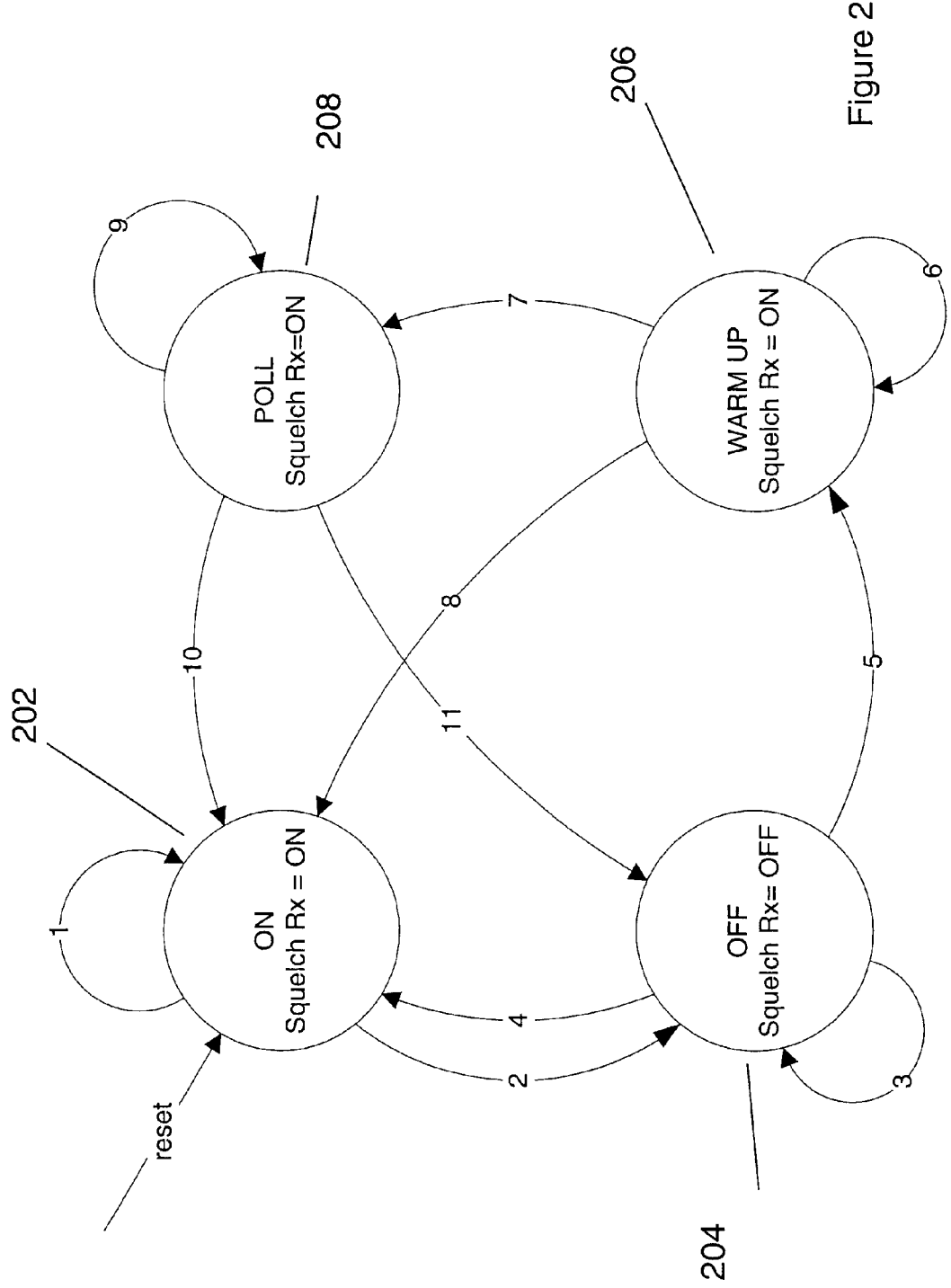
FIG. 2 is a flowchart for a method as utilized in one embodiment of the claimed subject matter.

FIG. 2 is a flowchart for a method as utilized in one embodiment of the claimed subject matter. As previously described in FIG. 1, the flowchart depicts a method for a state machine that may be implemented in an ICH for controlling the power state of the Squelch Receiver and utilizes masking logic to mask the output of the squelch receiver and counters to count the various Timeout conditions involved.

Initially, the State Machine is initialized to the ON state 202. Once the PCI Express link is in a state where polling of the squelch receivers is desired (L1 or Detect), the control logic for the squelch receiver transitions to the OFF state 204. In the OFF state the Squelch receiver is powered down and the output of the squelch receiver is masked off. In one embodiment for this state, a counter is used to count the amount of time $T_{OFF}$ to wait before turning on the receiver again. For example, $T_{OFF}=1$/Poll Rate. In one embodiment, Toff varies based at least in part on the actual link state because the maximum permissible latency is different for different states. For instance, one could poll every one us in L1 and in Detect could poll every 1 ms. The state machine moves to the WARM UP state 206 after Toff has elapsed. In this state, the Squelch receiver is turned on, but the output of the Squelch receiver remains masked. The counter is used to count the amount of time ($T_{WARMUP}$) needed for the Squelch receiver to stabilize. Once the Warm Up time has elapsed, the State Machine moves to the POLL state 208, where the output of the squelch receiver is unmasked and sampled by the Port specific logic, if the Squelch receiver senses a non-idle condition, then the state machine moves to the ON state, where the squelch receiver remains on and its output remains unmasked.

Figure 3:
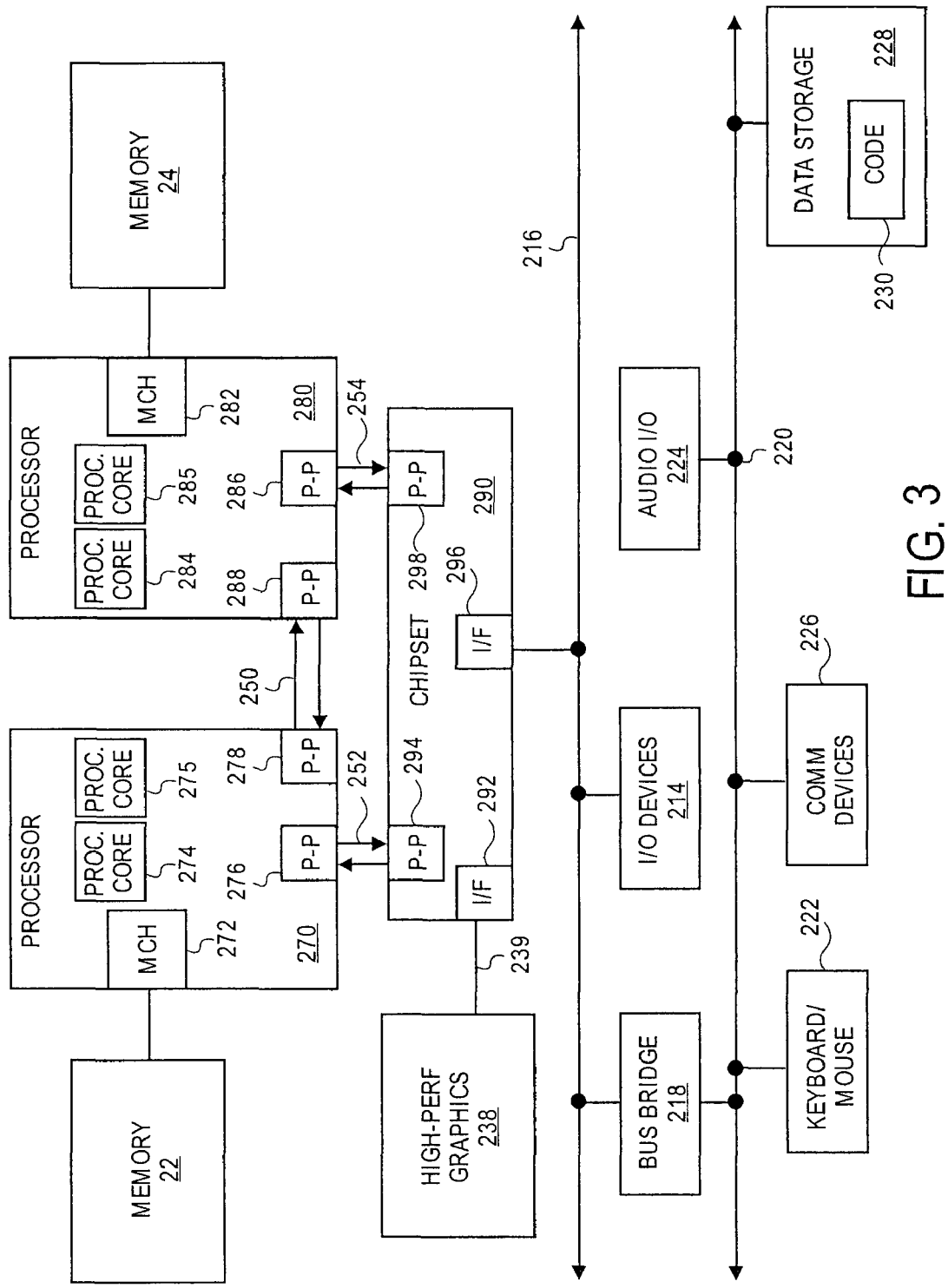
FIG. 3 is a system as utilized by one embodiment of the claimed subject matter.

FIG. 3 is a system as utilized by one embodiment of the claimed subject matter. In particular, FIG. 3 shows a system where processors, memory, and input/output devices are interconnected by a number of point-to-point interfaces.

The system of FIG. 3 may also include several processors, of which only two, processors 270, 280 are shown for clarity. Processors 270, 280 may each include a memory controller or a local memory controller hub (MCH) 272, 282 to connect with memory 22, 24. The memory could be a cache memory, SRAM, and/or DRAM. In one embodiment, processors 270, 280 may exchange data via a point-to-point (PtP) interface 250 using PtP interface circuits 278, 288. Processors 270, 280 may each exchange data with a chipset 290 via individual PtP interfaces 252, 254 using point to point interface circuits 276, 294, 286, 298. In one embodiment, the processors 270 and 280 would have multiple processor cores. Chipset 290 may also exchange data with a high-performance graphics circuit 238 via a high-performance graphics interface 239. In one embodiment, the PtP interface may utilize a PCI express protocol.

Figure 4:
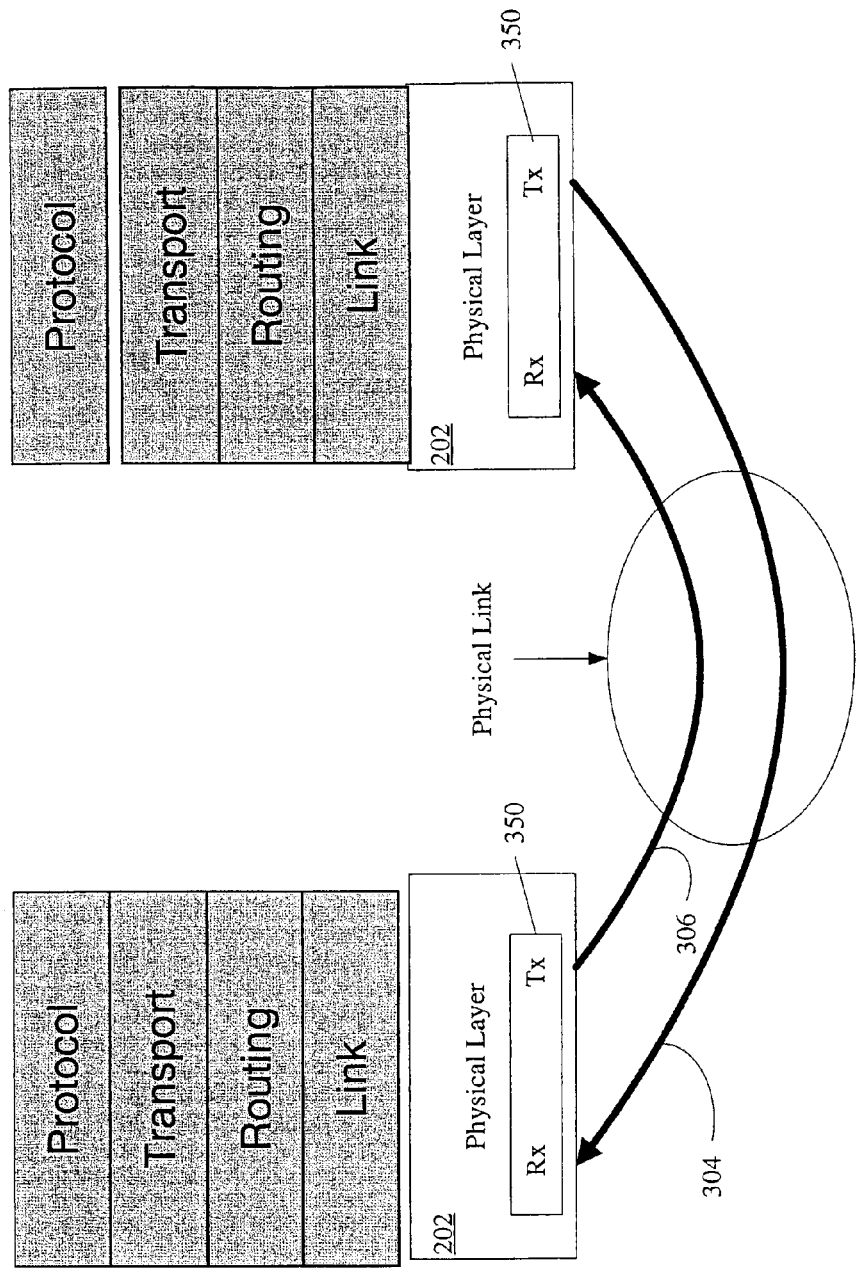
FIG. 4 is a block diagram of an apparatus for physical interconnect utilized in accordance with the claimed subject matter.

FIG. 4 is a block diagram of an apparatus for a physical interconnect utilized in accordance with the claimed subject matter. In one aspect, the apparatus depicts a layered protocol and may comprise either or all of: a link layer, a protocol layer, a routing layer, a transport layer, and a physical layer physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bi-directional links, etc.

Also, the claimed subject matter depicted in the previous Figures and Tables may be implemented in software. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. An input/output controller component comprising:
   a logic to define and monitor a plurality of states to control a power state for a squelch receiver for an interconnect link, the logic to power down the squelch receiver in response to a state of the interconnect link;
   a masking logic to mask an output of the squelch receiver utilized in the interconnect link, wherein a time during which the output of the squelch receiver is masked is based at least in part on an actual link state, where, for the actual link state, a maximum permissible latency for unmasking of the output of the squelch receiver is different for different states and is inversely proportional to a polling rate corresponding to a receiver state; and
   a plurality of counters used to define various timeout conditions for the plurality of states that control the power state of the interconnect link.

2. The input/output controller component of claim 1 wherein the timeout conditions are based upon the state of the interconnect link.

3. The input/output controller component of claim 1 wherein the plurality of states are defined for on, off, warm up, and polling.

4. The input/output controller component of claim 1 wherein the interconnect link is a PCI express link.

5. The input/output controller component of claim 1 wherein the squelch receiver is turned off for the plurality of states except for a polling state, wherein the squelch receiver is turned on for a period of time that is adjusted based on the state of the link, and for a warm up state that masks an output of the squelch receiver.

6. An article of manufacture comprising:
   a non-transitory machine-readable medium having a plurality of machine readable instructions, wherein when the instructions are executed by a system, the instructions provide to control a receiver circuit for an interconnect link:
   defining a plurality of states for the receiver circuit;
   powering down the squelch receiver in response to a state of the interconnect link;
   masking an output of the receiver circuit for a first predetermined state of the plurality of states, wherein a time during which the output of the receiver circuit is masked is based at least in part on an actual link state, where, for the actual link state, a maximum permissible latency is different for different states and is inversely proportional to a polling rate corresponding to a receiver state; and
   polling the state of the interconnect link for a second predetermined state.

7. The article of manufacture of claim 6 wherein polling the state is based on a time period established in a counter.

8. The article of manufacture of claim 6 wherein the interconnect link is a PCI express link.

9. The article of manufacture of claim 6 wherein the plurality of states are on, off, warm up, and polling.

10. A system comprising:
    a processor to execute an instruction;
    a memory to store data for the processor,
    an input/output controller to coordinate communication between the processor and memory via an interconnect;
    the input/output controller with a logic to define and monitor a plurality of states to control a power state for a squelch receiver for an interconnect link and to power down the squelch receiver in response to a state of the interconnect link;
    a masking logic to mask an output of the squelch receiver utilized in the interconnect link, wherein a time during which the output of the squelch receiver is masked is based at least in part on an actual link state, where, for the actual link state, a maximum permissible latency for unmasking of the output of the squelch receiver is different for different states and is inversely proportional to a polling rate corresponding to a receiver state; and
    a plurality of counters used to define various timeout conditions for the plurality of states that control the power state of the interconnect link.

11. The system of claim 10 wherein the timeout conditions are based upon the state of the interconnect link.

12. The system of claim 10 wherein the plurality of states are defined for on, off, warm up, and polling.

13. The system of claim 10 wherein the interconnect link is a PCI express link.

14. The system of claim 10 wherein the squelch receiver is turned off for the plurality of states except for a polling state, wherein the squelch receiver is turned on for a period of time that is adjusted based on the state of the link, and for a warm up state that masks an output of the squelch receiver.

* * * * *